US010496401B2

(12) United States Patent
Eberlein et al.

(10) Patent No.: US 10,496,401 B2
(45) Date of Patent: Dec. 3, 2019

(54) MANAGING RENAME OF TABLES AND TABLE FIELDS

(71) Applicant: SAP SE, Walldorf (DE)

(72) Inventors: Peter Eberlein, Malsch (DE); Volker Driesen, Heidelberg (DE)

(73) Assignee: SAP SE, Walldorf (DE)

( * ) Notice: Subject to any disclaimer, the term of this patent is extended or adjusted under 35 U.S.C. 154(b) by 213 days.

(21) Appl. No.: 15/346,253

(22) Filed: Nov. 8, 2016

(65) Prior Publication Data

US 2018/0129676 A1    May 10, 2018

(51) Int. Cl.
*G06F 8/71* (2018.01)
*G06F 16/21* (2019.01)

(52) U.S. Cl.
CPC .............. *G06F 8/71* (2013.01); *G06F 16/213* (2019.01)

(58) Field of Classification Search
CPC .............. G06F 17/30123; G06F 8/71; G06F 17/30091; G06F 17/30339; G06F 16/213
See application file for complete search history.

(56) References Cited

U.S. PATENT DOCUMENTS

| 2001/0044795 | A1* | 11/2001 | Cohen | G06F 17/30699 |
| 2003/0037034 | A1* | 2/2003 | Daniels | G06Q 10/087 |
| 2005/0055357 | A1* | 3/2005 | Campbell | G06F 8/61 |
| 2008/0098037 | A1* | 4/2008 | Neil | G06F 17/30297 |
| 2008/0195868 | A1* | 8/2008 | Asokan | G06F 21/64 |
| | | | | 713/176 |
| 2013/0085991 | A1* | 4/2013 | Welden | G06F 17/30297 |
| | | | | 707/634 |
| 2014/0019423 | A1* | 1/2014 | Liensberger | G06F 17/30309 |
| | | | | 707/690 |
| 2014/0095472 | A1* | 4/2014 | Lee | G06F 17/30463 |
| | | | | 707/714 |
| 2018/0081922 | A1* | 3/2018 | Brown | G06F 17/30477 |

OTHER PUBLICATIONS

Linux man page for mv command, https://linux.die.net/man/1/mv, 2011. (Year: 2011).*

* cited by examiner

*Primary Examiner* — Jay A Morrison
(74) *Attorney, Agent, or Firm* — Buckley, Maschoff & Talwalkar LLC

(57) ABSTRACT

According to some embodiments, a system and method are provided to automatically rename database objects. The system receives a rename file comprising (i) a plurality of database object names representing a plurality of database objects associated with an application and (ii) an identity assignment associated with one or more of the plurality of database objects. One or more of the plurality of database objects are automatically renamed based on (i) a currently installed version of the application, (ii) a version of the application associated with the rename file and (iii) the identity assignment associated with the one or more of the plurality of database objects.

20 Claims, 9 Drawing Sheets

---

100

110
Receiving A Rename File Comprising (i) A Plurality Of Database Object Names Representing A Plurality Of Database Objects Associated With An Application And (ii) An Identity Assignment Associated With One Or More Of The Plurality Of Database Objects 120
Automatically Renaming One Or More Of The Plurality Of Database Objects Based On (i) A Currently Installed Version Of The Application, (ii) A Version Of The Application Associated With The Rename File And (iii) The Identity Assignment Associated With The One Or More Of The Plurality Of Database Objects

200

| | Objects | Identity Assignment |
|---|---|---|
| $V_1$ | A<br>B<br>C | |
| $V_2$ | D (GUID$_A$)<br>B<br>C | A → GUID$_A$ |
| $V_3$ | B (GUID$_A$)<br>A (GUID$_B$)<br>D (GUID$_C$) | A → GUID$_A$<br>B → GUID$_B$<br>C → GUID$_C$ |
| $V_4$ | B (GUID$_A$)<br>A (GUID$_B$)<br>D (GUID$_C$)<br>C (GUID$_{C2}$) | A → GUID$_A$<br>B → GUID$_B$<br>C → GUID$_C$ |
| $V_5$ | B (GUID$_A$)<br>A (GUID$_B$)<br>C (GUID$_C$)<br>D (GUID$_{C2}$) | A → GUID$_A$<br>B → GUID$_B$<br>C → GUID$_C$ |

| V | Objects | Identity Assignment | From V0 | From V1 | From V2 | From V3 | From V4 | Dictionary |
|---|---|---|---|---|---|---|---|---|
| 0 | | | | | | | | |
| 1 | A<br>B<br>C | | Create A<br>Create B<br>Create C | | | | | A<br>B<br>C |
| 2 | D (GUID$_A$)<br>B<br>C | A → GUID$_A$ | Create B<br>Create C<br>Create D | A → D | | | | B<br>C<br>D = GUID$_A$ |
| 3 | B (GUID$_A$)<br>A (GUID$_B$)<br>D (GUID$_C$) | A → GUID$_A$<br>B → GUID$_B$<br>C → GUID$_C$ | Create A<br>Create B<br>Create D | A ↔ B<br>C → D | B → A<br>D → B<br>C → D | | | A = GUID$_B$<br>B = GUID$_A$<br>D = GUID$_C$ |
| 4 | B (GUID$_A$)<br>A (GUID$_B$)<br>D (GUID$_C$)<br>C (GUID$_{C2}$) | A → GUID$_A$<br>B → GUID$_B$<br>C → GUID$_C$ | Create A<br>Create B<br>Create C<br>Create D | A ↔ B<br>C → D<br>Create C | B → A<br>D → B<br>C → D<br>Create C | Create C | | A = GUID$_B$<br>B = GUID$_A$<br>C = GUID$_{C2}$<br>D = GUID$_C$ |
| 5 | B (GUID$_A$)<br>A (GUID$_B$)<br>C (GUID$_C$)<br>D (GUID$_{C2}$) | A → GUID$_A$<br>B → GUID$_B$<br>C → GUID$_C$ | Create A<br>Create B<br>Create C<br>Create D | A ↔ B<br>Create D | B → A<br>D → B<br>Create D | D → C<br>Create D | C ↔ D | A = GUID$_B$<br>B = GUID$_A$<br>C = GUID$_C$<br>D = GUID$_{C2}$ |

*FIG. 2B*

| DDIC table: Table – GUID Identity Assignment | |
|---|---|
| Name Table (K) | GUID Table |
| MATERIAL | 3X1A |
| STOCK | 8AED |
| ORDERS | 5CEA |

FIG. 5

| DDIC table: Table Information | | | | |
|---|---|---|---|---|
| Name Table (K) | GUID Table | Type | Attributes | Partitioning |
| MATERIAL_AUTOMOTIVE | 3X1A | Column store | | |
| STOCK | | Column store | | |
| ORDERS | | Row store | | |

DDIC Table: Column Information

| Name Table (K) | GUID Table | Name Column (K) | Guid Column | Type | Length | Key | ... |
|---|---|---|---|---|---|---|---|
| MATERIAL | 3X1A | ID | 4DF1 | int | | X | |
| MATERIAL | 3X1A | MTYPE | 5E2A | CHAR | 128 | | |
| ... | | | | | | | |

MANAGING RENAME OF TABLES AND TABLE FIELDS

BACKGROUND

Databases may comprise objects such as tables and views. Each of these objects may comprise a plurality of fields. A software developer that created an object and later noticed a typo in a name associated with the object (e.g., a table name or field name), may desire to correct the typo without impacting a software product associated with the database. While the software developer may expect that object names may be altered after initial creation of a database, once a database is in use, such as supporting a software product, changing an object name or field name may be problematic. Instead of being able to rename an object such as a table, conventional names changes often require dropping an old table and then creating a new table. Furthermore, during a re-design of a database, database objects may be moved between different packages and a new software package may use a different namespace. In this situation, a new table may have to be created and the data from the old table may have to be copied to the new table. Moving data is typically costly in that it uses a lot of processor time and it can be very time consuming when moving large amounts of data.

Some database frameworks expect field names to comprise a specific name (e.g. client, aging, language, UserID, etc.). If an existing table is plugged into such a framework, the existing table may need to have its fields renamed or free a field name for a new field which is required by the framework database.

Furthermore, legacy systems may use tables and fields with abbreviated names to match old limitations in name length. For a database developer that is designing views and database procedures, more descriptive names may be desired. Thus, for legacy systems, there is a need to rename the objects in the database to be more descriptive. It would therefore be desirable to provide a system and method to rename database objects without the problems described above (e.g., having to create a new table and copy data to the table).

BRIEF DESCRIPTION OF THE DRAWINGS

FIG. 2A illustrates a portion of a rename file according to some embodiments.

FIG. 2B illustrates a rename file and renaming logic according to some embodiments.

FIG. 5 illustrates table information according to some embodiments.

FIG. 6 illustrates identity assignments in accordance with some embodiments.

FIG. 7 illustrates column information in accordance with some embodiments.

DETAILED DESCRIPTION

Figure 1:
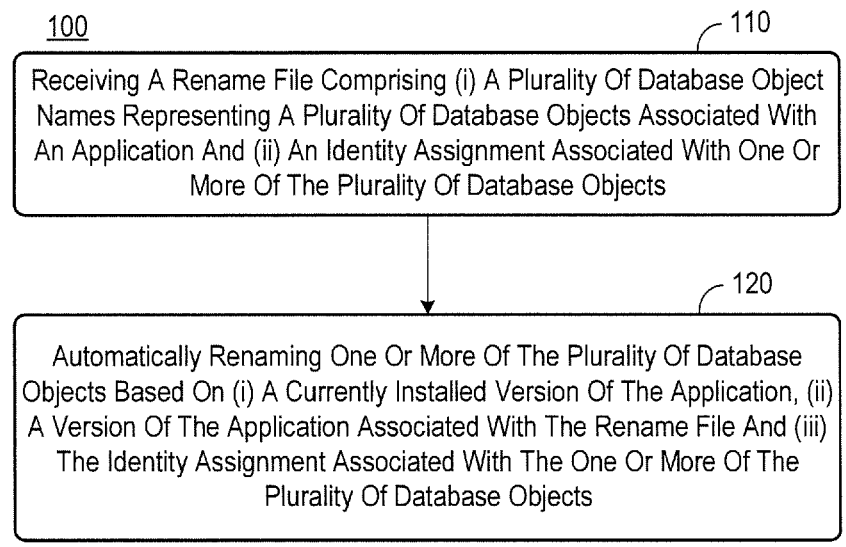
FIG. 1 is a method in accordance with some embodiments.

In the following detailed description, numerous specific details are set forth in order to provide a thorough understanding of embodiments. However it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In particular, the present embodiments described herein relate to automatically renaming database objects. For example, when an application is updated with a new version (e.g., a software update), database objects associated with the new version may need to be renamed. Furthermore, the present embodiments relate to assigning a globally unique identifier ("GUID") to each database object to support rename management by uniquely identifying objects independent of their current name (e.g., table names and field names). A GUID may comprise a number having a least 122 random bits such that a duplicate GUID may never occur. In some embodiments, associating an object with a GUID does not occur at a time when a new object is initially created and this may reduce overhead associated with objects that have never been altered throughout their lifecycle. Associating an object with a GUID may be introduced into database systems that were not set up with GUID assignments from the start, thus easing the transition into this new handling mechanism.

The present embodiments may further relate to a system where, when a rename is performed for a first time, actions that are required to be executed are automatically determined based on comparing a current object vs. a target object name for a given GUID. In this manner, no intermediate information may be required and updates associated with upgrading from previous names to current names may be performed without performing intermediary renames (e.g., for example if a table is named T1 and later T2 and then renamed to T4). For example, a single software release update may comprise a compilation of updates and assembled into a single software release package over a long time period (e.g., changes 3 months). In some embodiments, the assembled changes may contain several changes including several database object renames. In this example a customers may upgrade from release n, support package x to a release m and a support package y, if m>n and the release date of y is newer than x. Thus, the present embodiments relate to a method and system to rename database objects that may be simply dependent on the currently deployed release and a target release.

Now referring to FIG. 1, a method 100 is illustrated. The method 100 may be performed by some or all of the elements of a database system such as the database system described with respect to FIG. 8. The flow chart described herein does not imply a fixed order to the steps, and embodiments of the present invention may be practiced in any order that is practicable. Note that any of the methods described herein may be performed by hardware, software, or any combination of these approaches. For example, a non-transitory computer-readable storage medium may store thereon instructions that, when executed by a machine, result in performance according to any of the embodiments described herein.

While a rename can be simply annotated as "rename from a to b", in a case of multiple renames, sequencing and ordering problems may occur. Also, when updating software to a revision that is several revisions ahead (e.g., a jump upgrade) multiple re-names may need to be performed as a sequence of changes. This sequence may contain several rename actions. The embodiments described herein may facilitate an update to a database that is independent of intermediary states by updating database objects in, ideally, one step or in a minimal set of steps and by not following each intermediate step.

At 110, a rename file is received. The rename file may comprise (i) a plurality of database object names representing a plurality of database objects associated with an application and (ii) an identity assignment associated with one or more of the plurality of database objects. In some embodiments, the rename file may comprise two individual files, an object definition file and an assignment file. In this embodiment having two individual files, the object definition file may comprise a plurality of database object names and the assignment file may comprise the identity assignment associated with the one or more of the plurality of database objects.

When a new software update is released, the software update may include a rename file that comprises a plurality of database object names and, for each of the plurality of database object names, an identity assignment. Each identity assignment may indicate a GUID assignment for one or more objects of the plurality of database objects that require a GUID. Once an identity assignment associated with a GUID is made, is may never be changed. All identify assignments may be included in each new version of the rename file. For example, when a next software update is released, the next software update may comprise a rename file that includes all previous identity assignments.

Now referring to FIG. 2A, an embodiment of a rename file 200 is illustrated. Rename file 200 may represent a rename file associated with a fifth version of a software application. As illustrated in FIG. 2A, objects 220 and their associated identity assignment 230 may be changed with each version of the software application. The object column 220 may comprise object definitions as shipped in each respective version of the software application. Object definitions may, or may not include a GUID since a GUID may only be needed if (A) the object has been renamed since it was created or (B) if a new object is to be introduced with a name that has been previously used for another object. The identity assignment column 230 may indicate assignments of GUIDs to object names. The identity assignment column 230 may only contain assignments for objects that require a GUID. Once an assignment of a GUID to an object is made, the assignment is never changed thereafter. All cumulated assignments may be included in each new version of the rename file.

Referring back to FIG. 1, at 120, one or more of the plurality of database objects may be automatically renamed based on (i) a current version of the application, (ii) a version of the rename file and (iii) the identity assignment associated with the one or more of the plurality of database objects. The renaming may be performed by a processor, such as the processor described with respect to FIG. 8.

In some embodiments, if renames are "stacked", renaming may need to be performed in a sequence instead of a single step. For example, the following renames a→c, c→d, b→c may result in a→d and b→c. In a second example, the following renames b→c, c→d, a→c may result in b→d and a→c. In a third example, the following renames a→b, b→a may result in a name change (e.g., a and b change names). However, this name change may not be able to be performed in a single step and a rename such as b→x, a→b, x→a may be used where x is a dummy rename.

For illustrative purposes, and to aid in understanding features of the specification, some examples will now be introduced. These examples are not intended to limit the scope of the claims.

Referring back to FIG. 2A, when upgrading from version 1 to version 2, only one object will be renamed (A→D). Since D will be renamed, D is delivered with a reference to a GUID (in this case $GUID_A$), and the GUID for the original version of the object is declared as (A→$GUID_A$). Object A may now be renamed as object D with no impact to the software application because the object has now been referenced using $GUID_A$.

Referring now to FIG. 2B, in some embodiments, FIG. 2B may represent an embodiment of a rename file 200 that illustrates the logic that will be automatically performed depending on the upgrade performed. The logic that is automatically performed may be different for each update and may be based on which of the five different versions of the software is currently being used and a version of the software that is associated with the update. For example, FIG. 2B illustrates logic 240 for upgrading from version 0 ($V_0$), logic 250 for upgrading from version 1 ($V_1$), logic 260 for upgrading from version 2 ($V_2$), logic 270 for upgrading from version 3 ($V_3$), logic 280 for upgrading from version 4 ($V_4$). The logic may define calculated actions that may be automatically performed by a system during an upgrade (e.g., from the version of the column to the version of the row). The logic may be automatically performed in response to receiving a rename file and the logic may be determined based on the rename file and a current state (e.g., version) of the database of a software application. Furthermore, FIG. 2B may also illustrate entries in a data dictionary 290. The data dictionary 290 may be stored in a database such as the database described with respect to FIG. 8 or, in some embodiments, the data dictionary 290 may be included as part of the rename file.

In some embodiments, a swap symbol (← →) may be implemented by a renaming a first object to a temporary name (e.g., its GUID), then renaming the second object to the name of the first object and then renaming the object with the temporary name to the name of the second object. The actions may be calculated by comparing the target version of the software application with the source version in the data dictionary 290 after the data dictionary 290 has been updated as described below.

The mapping of current names to GUIDs (if there have been GUIDs assigned to those objects) may be performed after an upgrade has been completed (e.g. the database has reached a target state). The data dictionary 290 may be updated with new assignments delivered with the current version for objects that did not have an assignment before. Also, new entries in the data dictionary 290 may be created without assignment when a new object includes a GUID in its initial definition (e.g. object D in version 5 is assigned $GUID_{C2}$).

Continuing with the above-examples, and referring again to FIG. 2B, version 1 of the software application may comprise three database objects: A, B and C. When the software application as updated to version 2, version 2 will use object D, B and C with D being assigned to $GUID_A$ as illustrated in the objects column 220. Thus, the identity assignment column 230 indicates that A will be assigned $GUID_A$ (a unique identifier) and, as such, object A will be renamed to object D. For example, the system may then rename table A using an alter table command. To keep track of the object changes, the data dictionary 290 may now store object B, object C and object D which has been assigned $GUID_A$. Now that D has been assigned $GUID_A$, no matter what D is renamed to, it will always be assigned $GUID_A$.

In a next example, it will be assumed that a user is installing version 5 of the software as an upgrade from version 2 of the software. Therefore, this example may illustrate a jump upgrade from version 2 to version 5. In other words, version 3 and version 4 of the software were not installed. Since version 2 will now jump to version 5, the objects in version 5, as indicated in the object column 220 indicate object B is assigned to $GUID_A$, object A is assigned to $GUID_B$, object D is assigned to $GUID_C$ and object C is assigned to $GUID_{C2}$. The identity assignment column 230 indicates that object A will be assigned to $GUID_{C2}$, object B will be assigned to $GUID_B$, and object C will be assigned to $GUID_C$.

To accomplish the upgrade from version 2 to version 5, the database system may first rename object B to object A. Note that the GUID of object B ($GUID_A$) will not change after being renamed but that $GUID_A$ will be reassigned to object A. Similarly, the database system may rename object D to object B. Note that the GUID of object D ($GUID_{C2}$) will not change after being renamed but that $GUID_{C2}$ will now be reassigned to object B. Finally, object D will be created.

A third example will now be introduced. In the third example, it will be assumed that the software application is being upgraded from version 3 to version 4. In version 4, a new object named C may be created (e.g., as illustrated in FIG. 2B, a different object that was originally named C had been renamed in an earlier release to D). If a new object is to be created, which had been previously deleted or renamed, the new object must be accompanied by a GUID from the beginning (e.g., in this example, the new object named C is assigned $GUID_{C2}$), and the GUID may be added to the objects column 220. In the identity assignment column 230, there is an assignment of the original C to a GUID (e.g., the first C which had been created in the system with the $GUID_C$), but no assignment to the new C because, for this object, a GUID is provided in the object column 220 from the start, so no subsequent assignment may be required.

As illustrated in FIG. 2B, and referring to the data associated with version 1, all objects are new and thus no rename is needed and there is no need for assigning GUIDs to objects. However, when referring to version 4, an object has been re-created with a different semantic where the earlier object was renamed. Thus, the new the object may be delivered with a new GUID (e.g., C is assigned $GUID_{C2}$). For updating the data dictionary, in version 1 there are no data dictionary updates. In version 2, the $GUID_A$ is first assigned to A in the data dictionary. Then, the target may be evaluated, D is assigned to $GUID_A$, a rename is executed (A→D) and the data dictionary is updated with D now being assigned to $GUID_A$. A is no longer in the data dictionary.

Multiple renames of objects may lead to sequence and ordering problems. An example associated with handling multiple re-names will now be illustrated. For example, an initial shipment comprises object T1. While developing a new version, object T1 is renamed to T2 and is assigned GUID 3X2Y. However, during development object T2 is renamed to T4 and is assigned GUID 3X2Y. A new object T1 is created and assigned GUID B2WS. The name change to T2 was made during an internal development process as an intermediary step and changed to T4 before delivery. The delivery thus contains only T4 (GUID 3X2Y) and T1 (GUID B2WS). The information, that T1 had been renamed to T2 in a development step may not be shipped. The target information about the object definition may be shipped with no intermediary information. In a runtime system, T1 may be created and, for a rename, a GUID may be assigned and stored as an attribute of a table (e.g. in a data dictionary). For an update, the new definition may be used and T4 may be assigned to GUID 3X2Y and a new object is created as T1 which is assigned GUID B2WS.

The deployment sequence may be thus: (i) determine the GUIDs of the target objects associated with the delivery package (e.g., T1 (GUID B2WS), T4 (GUID 3X2Y)), (ii) read the active objects from the database and determine their GUIDs (e.g., T1 (GUID 3X2Y)), (iii) determine if objects have been renamed, (iv) determine existing objects for all GUIDs in the target list, (v) identify, if an object is already available and if it is available, determine, if the name has changed, and (vi) rename objects (e.g., GUID: 3X2Y having been renamed from T1 to T4).

The logic associated with object deletions is discussed below. When an object is deleted, deletions may be associated with a deletion list. The deletion list may be delivered together with the rename file or may be delivered previously if the object had been renamed in the past. In some embodiments, the deletion list may be appended to the rename file. The deletion list may comprise the GUID associated with the object (e.g., and optionally the object name). An assignment of the object name to the GUID may need to already exist in the assignment file. The object to be deleted may then be removed from the database and/or data dictionary during deployment. This approach may allow for computing a drop/create for objects, which had once been delivered, then deleted and later been re-created with a different context (and thus GUID). Depending on an upgrade jumping over versions, a drop old, create new may be created for an upgrade if the drop had been in an intermediary version, or a create may be created if an upgrade starts from a version when the object had been dropped.

In some embodiments, GUIDs may be introduced in a late release. For example, releases 1 and 2 may have been shipped without using GUIDs for objects and without a need for deleting or renaming objects. However, in release 3, a GUID and rename for some objects may be shipped and again in release 4. Delivery of release 4 may need to bring the initial GUID mapping of release 3 in addition. Since the rename file, including the identity assignment section, may always be shipped and is only appended to for each software upgrade, existing entries must not be modified or deleted and the existing entries may remain in the file. This may allow for upgrade paths jumping over releases with intermediary renames without having to follow each intermediary change.

To execute deployment of a new release, the new version may be deployed by first deploying a rename file (e.g., a file comprising the identity assignment). The objects in the data dictionary may be read and for each object which does not have a GUID, the entry in the assignment file may be searched and a respective GUID may be entered in the data dictionary (e.g. version 2: A=$GUID_A$).

Next, actions such as renaming and adding tables may be computed. After renaming and adding tables, objects may be dropped based on the drop list. Drop statements may be written to a work list that will be executed. Next, a comparison of the data dictionary of a source version is made with object definitions associated with the target version. Object definitions in the rename file may be read, including the GUID if specified (e.g. version 2: D (GUID$_A$)). Next, the data dictionary information may be read and the GUID read from the target may be searched against the data dictionary. In a case that the GUID is not found in data dictionary, a new object may be created. In a case that the GUID is found but the name in data dictionary is different than the name in the target file, a rename may be performed (e.g., version 2: A (GUID$_A$), matches D (GUID$_A$), thus rename A to D).

Next, write actions may be indicated on the work list to be executed. For example, if a create has been found, an entry in the work list may be created with the create statement (e.g. version 4: "create table C"). If a rename has been found, an entry in the work list may be created with the rename statement (e.g. version 2: "rename table A to D"). Next, actions may be executed along with conflict detection. In some embodiments, successfully executed actions may be removed from the work list. The drop statements may be executed and then removed from the work list.

For the rename statements, a loop may start starts where a rename statement is first read from the work list. Next a check is performed to determine if the target object name is already used. If the target object name is already used, the rename statement is skipped (e.g., this logic implicitly moves the statement with a used target behind a statement, which renames or drops an object). If the target object name has not been used, the rename statement will be executed (e.g., an atomic operation).

Next, the data dictionary may be updated with a new GUID. In some embodiments, the data dictionary may be either updated or a new entry may be created. Finally, a commit command (or a roll-back command) may be executed. This may be done for objects renamed to a temporary name as described herein.

A next statement on the work list is analyzed and if, (i) in one iteration of the loop, nothing is executed and (ii) the remaining operations are cyclic, the loop may be broken. If the look is broken, a rename statement which had been blocked (say, A 4 B, B already exists) may be read. The statement for the first rename statement found may be altered (e.g., the target of the rename to the object's GUID may be altered (say A→GUID$_A$)). Next, a rename statement may be added to the end of the work list (e.g., a rename from GUID$_A$ to the target name. (GUID$_A$→B)). A statement with a former source (e.g., A) as a target, which had blocked execution, may be determined and this statement may be executed (e.g., its respective target is free now, say C→A). This cycle may continue with a next former source (e.g., C, say B→C). A next statement in this cycle may comprise a rename from the GUID to the first blocked name that had been added earlier (GUID$_A$→B) If cycle is done, a next object may be used and the process may be repeated. In some embodiments, other algorithms may be possible such as, but not limited to, a "brute force" rename of all objects to their GUID and then a rename of all objects to their targets.

Figure 3:
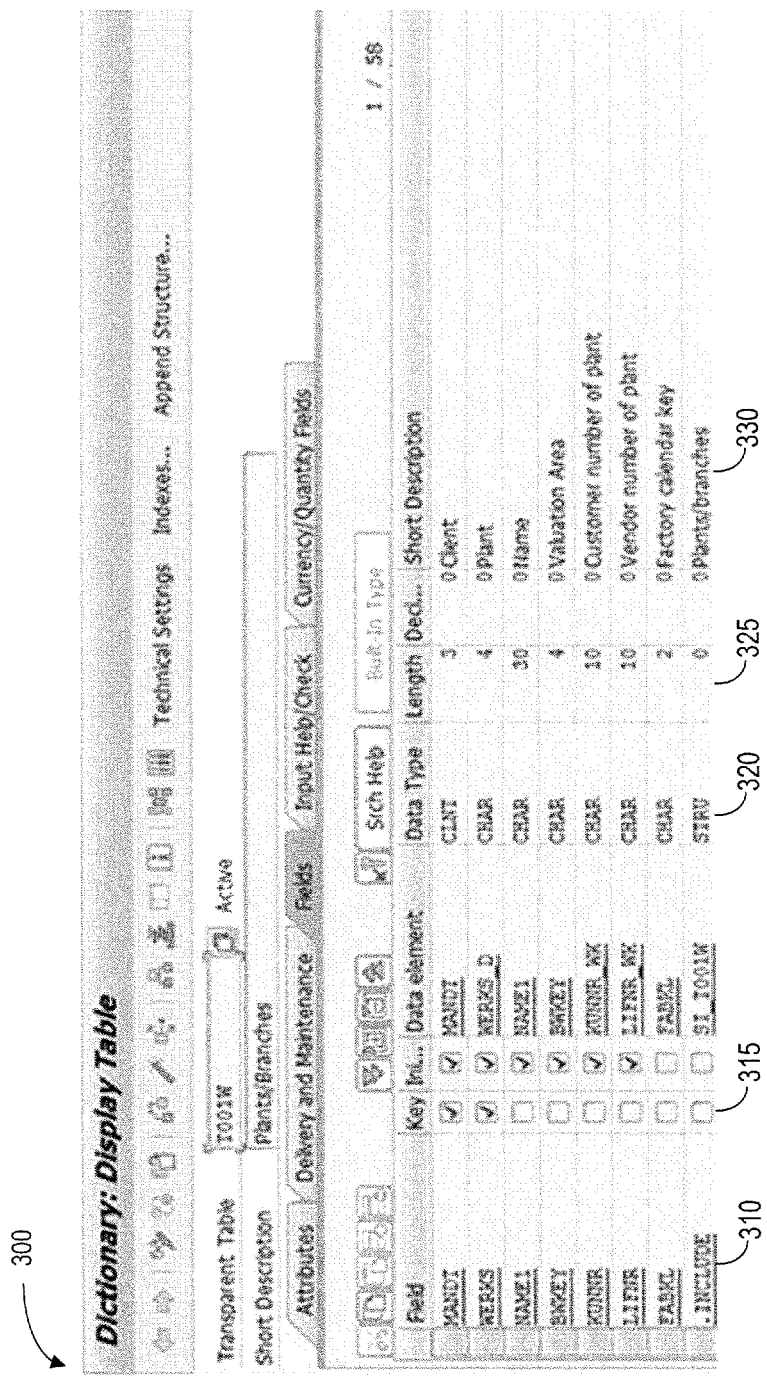
FIG. 3 illustrates a table control editor in accordance with some embodiments.
Figure 4:
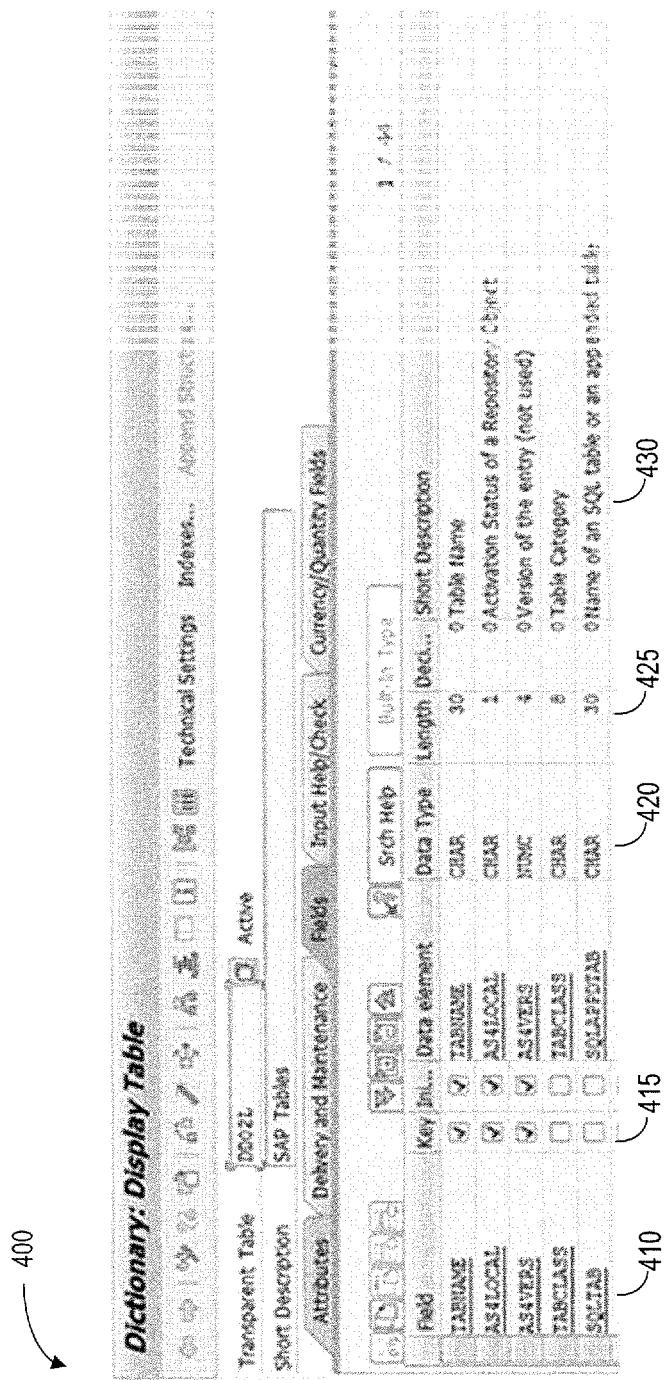
FIG. 4 illustrates a table for storing and delivering table declarations in accordance with some embodiments.

FIG. 3 and FIG. 4 may relate to variants of editors associated with renames. A database object, such as a table, may be defined via a statement, such as, but not limited to a DSL statement or a Data Definition Language ("DDL") statement. For a table control based editor, the table name may be specified in a respective field of a user interface. Each column of the table may be specified, with name, type, length in an entry in the table control based editor. Additional attributes may be specified (e.g., partitioning, column or row store . . . ) in their own fields on the user interface. The information may be shipped as content in tables (e.g. one table for the database table attributes and one for the fields).

An example of using a text based Editor is illustrated below. For the text based editor, the following text may be used specified to declare tables.

```
table MATERIAL {
    key: ID int;
    MTYPE char 128;
};
```

This text may be stored in a file that can be named as desired and has, in this case, no impact on the table name. In some embodiments, a file can also contain several table definitions. A texted based rename maybe declared as follows:

```
table MATERIAL_AUTOMOTIVE (GUID 3X1A){
    key: ID int;
    MTYPE char 128;
    HEADER char 256;
};
identity assignment {
    MATERIAL : 3X1A;
};
```

If the initial delivery does not contain a GUID, the GUID of the initially delivered table may be defined in an assignment file. The file declaring the table (and in this case a rename of a table) may reference the GUID of the initial table declared in the assignment file. A later second rename may reference the same GUID.

```
table MAT_AUTO_MASTER (GUID 3X1A){
    key: ID int;
    MTYPE char 128;
    HEADER char 256;
};
table MAT_AUTO_DETAIL {
    key: ID int;
    key: POS int;
    MTYPE char 128;
    POSITION char 256;
};
identity assignment {
    MATERIAL : 3X1A;
};
```

Referring now to FIG. 3, an example of a table control editor 300 is illustrated. As illustrated, the table control editor 300 may define fields such as, but not limited to, field name 310, key 315, data type 320, length 325 and short description 330. The field name 310 may define a name or title of a field. The key 315 field may indicate if a field will be a primary key for the table. The data type 320 field may associate a data type (e.g., text, char, varchar, etc.) with the field name 310. The length 325 may define a length of the field in bytes. The short description 330 may provide a description associated with the field name. The table control editor 300 may be extended easily to manage table and field names via GUIDs. The table control editor 300 may be extended by adding an additional GUID column (not shown in FIG. 3). If a developer changes a column definition, the existing definition in the table control editor 300 may be altered by a developer. This may be distinguished from creating a new column and dropping an old column, which would be create a new column via the control and delete an existing column. The data specified in the table control may be shipped as content in metadata tables for use with a data dictionary. The metadata may comprise both a header table for the information regarding the table and an item table for the information regarding the columns.

Now referring to FIG. 4 an embodiment of a table 400 for storing and delivering table declarations is illustrated. The table 400 may define fields such as, but not limited to, field name 410, key 415, data type 420, length 425 and short description 430. The field name 410 may define a name or title of a field. The key 415 may indicate if a field will be a primary key for the table. The data type 420 may associate a data type (e.g., text, char, varchar, etc.) with the field name. The length 425 may define a length of the field in bytes.

As discussed above, a GUID may be added for tables such as the tables illustrated in GUID identity assignment table 500 which are illustrated in FIG. 5. The tables in the GUID identity assignment table 500 may be renamed (e.g. in a later release) and there is no prerequisite for all tables to be assigned a GUID. FIG. 5 further illustrates a table name 510 and a GUID 520 associated with each particular table name 510. If a table is to be renamed, its GUID may be indicated in an identity assignment file (e.g., the rename file) and then updated with a target definition. Similarly, the approach may be used to rename individual fields. For example, a GUID may be added to a definition of a table as well as its individual fields. As illustrated in FIG. 6, table information 600 may define a new table name 610 and a type 620 of the table. Furthermore, as illustrated in FIG. 7, column information 700 may be provided where each table may comprise columns 710 that are assigned to individual GUIDS 720. The GUID for the table may be kept as a reference to the table. The solution described above may provide a technical advantage in that it solves a problem of renaming for situations such as cyclic renames, jump upgrades, deletes as well as re-creates.

Figure 8:
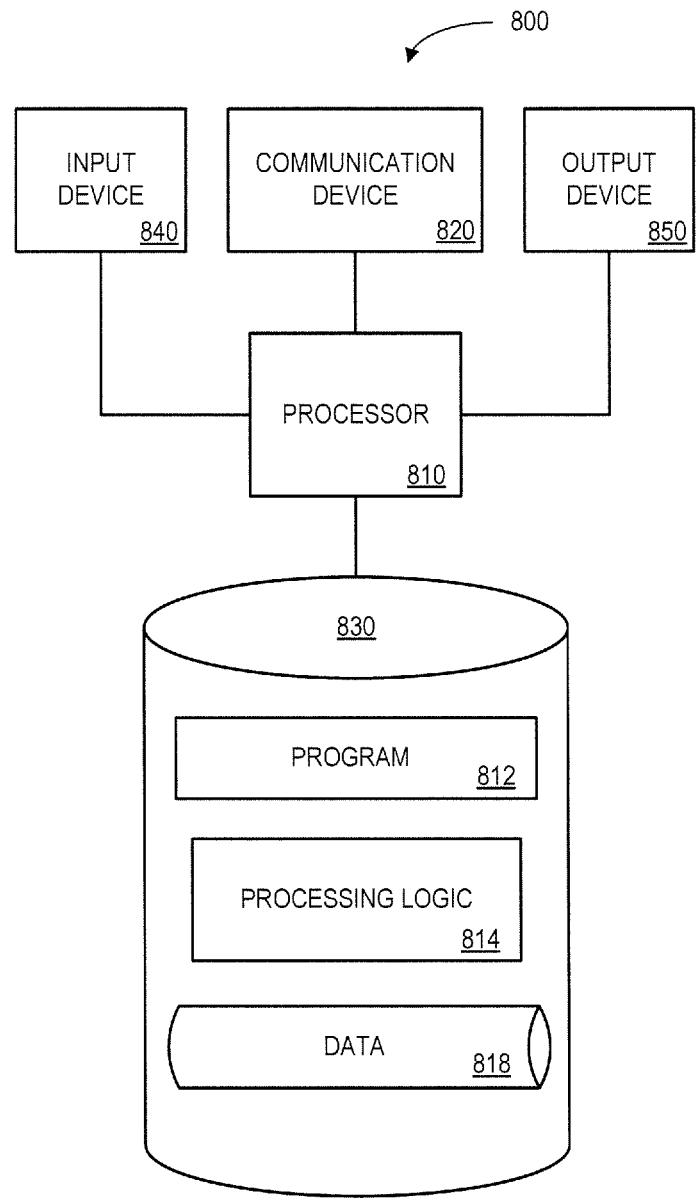
FIG. 8 illustrates a system according to some embodiments.

Note the embodiments described herein may be implemented using any number of different hardware configurations. For example, FIG. 8 illustrates a database platform 800 that may be, for example, associated with the method 100 of FIG. 1. The database platform 800 may comprise a processor 810 ("processor"), such as one or more commercially available Central Processing Units (CPUs) in the form of one-chip microprocessors, coupled to a communication device 820 configured to communicate via a communication network (not shown in FIG. 8). The communication device 820 may be used to communicate, for example, with one or more users. The database platform 800 further includes an input device 840 (e.g., a mouse and/or keyboard to enter information about the measurements and/or assets) and an output device 850 (e.g., to output and display the data and/or recommendations).

The processor 810 also communicates with a memory/storage device 830 that stores data 818. The storage device 830 may comprise any appropriate information storage device, including combinations of magnetic storage devices (e.g., a hard disk drive), optical storage devices, mobile telephones, and/or semiconductor memory devices. The storage device 830 may store a program 812 and/or processing logic 814 for controlling the processor 810. The processor 810 performs instructions of the programs 812, 814, and thereby operates in accordance with any of the embodiments described herein. For example, the processor 810 may rename database objects via the instructions of the programs 812 and processing logic 814.

The programs 812, 814 may be stored in a compressed, uncompiled and/or encrypted format. The programs 812, 814 may furthermore include other program elements, such as an operating system, a database management system, and/or device drivers used by the processor 810 to interface with peripheral devices.

As used herein, information may be "received" by or "transmitted" to, for example: (i) the platform 800 from another device; or (ii) a software application or module within the platform 800 from another software application, module, or any other source.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a database object renaming module. The method steps can then be carried out using the distinct software modules and/or sub-modules of the system, as described above, executing on one or more hardware processors 810 (FIG. 8). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

The invention claimed is:

1. A method of automatically renaming database objects, the method comprising:
receiving a rename file comprising (i) a plurality of database object names representing a plurality of database objects associated with an application and (ii) a respective first identity assignment associated with each respective one of the plurality of database objects, each respective first identity assignment present in a currently installed version of the application;
the rename file including a respective second identity assignment associated with each respective one of the plurality of database objects, each respective second identity assignment present in a subsequent version of the application associated with the rename file;
assigning each respective first identity assignment and each respective second identity assignment to a respective same globally unique identifier for each respective one of the plurality of database objects;
automatically renaming, via a processor, one or more of the plurality of database objects based on (i) the currently installed version of the application, and (ii) the subsequent version of the application, there being one or more interim versions between the currently installed version and the subsequent version, the one or more interim versions each including respective identity assignments for each respective one of the plurality of database objects, the interim version respective identity assignments being different than the respective first identity assignment and the second identity assignment;
the automatic renaming occurring with the one or more interim versions not being installed; and
for each of the plurality of database objects being renamed, changing within the subsequent version of the application each respective second identity assignment to the respective first identity assignment assigned to the same globally unique identifier.

2. The method of claim 1, wherein in case that the version of the application associated with the rename file is a first version and the currently installed version of the application is a first version, the plurality of database object names will be saved as the plurality of database objects in a database and the plurality of database object names will be saved in a database object dictionary.

3. The method of claim 1, wherein in case that the version of the application associated with the rename file is a second version and the currently installed version of the application is a first version, automatically determine actions to rename the one or more of the plurality of database objects.

4. The method of claim 1, wherein the identity assignment assigns a global unique identifier (GUID) to one or more of the plurality of database objects.

5. The method of claim 1, wherein each database object is a database table.

6. The method of claim 1, wherein each database object is a database column.

7. The method of claim 1, wherein automatically renaming comprises reading a rename statement from a work list and determining if a target object name is already used, wherein in a case that the target object name is already used, skipping the rename statement and wherein in a case that the target object name has not been used, executing the rename statement.

8. A non-transitory computer-readable medium comprising instructions that when executed by a processor cause the processor to perform a method of automatically renaming database tables, the method comprising:
receiving (i) a first file comprising a plurality of database table names representing a plurality of database tables associated with an application and (ii) a second file comprising a respective first identity assignment associated with each respective one of the plurality of database tables, each respective first identity assignment present in a currently installed version of the application;
the second file including a respective second identity assignment associated with each respective one of the plurality of database tables, each respective second identity assignment present in a subsequent version of the application associated with the second file;
assigning each respective first identity assignment and each respective second identity assignment to a respective same globally unique identifier for each respective one of the plurality of database tables;
automatically renaming, via a processor, one or more of the plurality of database tables based on (i) the currently installed version of the application, and (ii) the subsequent version of the application, there being one or more interim versions between the currently installed version and the subsequent version, the one or more interim versions each including respective identity assignments for each respective one of the plurality of database tables, the interim version respective identity assignments being different than the respective first identity assignment and the second identity assignment;
the automatic renaming occurring with the one or more interim versions not being installed; and
for each of the plurality of database tables being renamed, changing within the subsequent version of the application each respective second identity assignment to the respective first identity assignment assigned to the same globally unique identifier.

9. The medium of claim 8, wherein in case that the version of the application associated with the first file and the second file is a first version and the currently installed version of the application is a first version, the plurality of database tables names will be saved as the plurality of database tables in a database and the plurality of database table names will be saved in a database data dictionary.

10. The medium of claim 8, wherein in case that the version of the application associated with first file and the second is a second version and the currently installed version of the application is a first version, automatically determine actions to rename the one or more of the plurality of database tables.

11. The medium of claim 8, wherein the identity assignment assigns a global unique identifier (GUID) to one or more of the plurality of database tables.

12. The medium of claim 8, wherein the rename file comprises a first file comprising the plurality of database table names and a second file comprising the identity assignment associated with the one or more of the plurality of database tables.

13. The medium of claim 8, wherein automatically renaming comprises reading a rename statement from a work list and determining if a target object name is already used, wherein in a case that the target object name is already used, skipping the rename statement and wherein in a case that the target object name has not been used, executing the rename statement.

14. A system for renaming database objects, the system comprising:
- a processor; and
- a non-transitory computer-readable medium comprising instructions that when executed by a processor perform a method to automatically rename database objects, the method comprising:
- receiving a rename file comprising (i) a plurality of database object names representing a plurality of database objects associated with an application and (ii) a respective first identity assignment associated with each respective one of the plurality of database objects, each respective first identity assignment present in a currently installed version of the application;
- the rename file including a respective second identity assignment associated with each respective one of the plurality of database objects, each respective second identity assignment present in a subsequent version of the application associated with the rename file;
- assigning each respective first identity assignment and each respective second identity assignment to a respective same globally unique identifier for each respective one of the plurality of database objects;
- automatically renaming, via a processor, one or more of the plurality of database objects based on (i) the currently installed version of the application, and (ii) the subsequent version of the application, there being one or more interim versions between the currently installed version and the subsequent version, the one or more interim versions each including respective identity assignments for each respective one of the plurality of database objects, the interim version respective identity assignments being different than the respective first identity assignment and the second identity assignment;
- the automatic renaming occurring with the one or more interim versions not being installed; and
- for each of the plurality of database objects being renamed, changing within the subsequent version of the application each respective second identity assignment to the respective first identity assignment assigned to the same globally unique identifier.

15. The system of claim 14, wherein in case that the version of the application associated with the rename file is a first version and the currently installed version of the application is a first version, the plurality of database object names will be saved as the plurality of database objects in-a database and the plurality of database object names will be saved in a database object dictionary.

16. The system of claim 14, wherein the identity assignment assigns a global unique identifier (GUID) to one or more of the plurality of database objects.

17. The system of claim 14, wherein each database object is a database table.

18. The system of claim 14, wherein each database object is a database view.

19. The system of claim 14, wherein automatically renaming comprises reading a rename statement from a work list and determining if a target object name is already used, wherein in a case that the target object name is already used, skipping the rename statement and wherein in a case that the target object name has not been used, executing the rename statement.

20. The system of claim 14, wherein in case that the version of the application associated with the rename file is a second version and the currently installed version of the application is a first version, automatically determine actions to rename the one or more of the plurality of database objects.

* * * * *